(12) United States Patent
Abuaita et al.

(10) Patent No.: US 12,454,312 B1
(45) Date of Patent: Oct. 28, 2025

(54) SYSTEMS AND METHODS FOR HOLDING A STEERING WHEEL IN A STEER BY WIRE SYSTEM

(71) Applicant: GM GLOBAL TECHNOLOGY OPERATIONS LLC, Detroit, MI (US)

(72) Inventors: Raed Nasim Abuaita, Fenton, MI (US); Brian K. Saylor, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 16 days.

(21) Appl. No.: 18/746,892

(22) Filed: Jun. 18, 2024

(51) Int. Cl.
  *B62D 6/00* (2006.01)
  *B62D 5/00* (2006.01)

(52) U.S. Cl.
  CPC .............. *B62D 6/008* (2013.01); *B62D 5/006* (2013.01)

(58) Field of Classification Search
  CPC ................................ B62D 6/008; B62D 5/006
  See application file for complete search history.

(56) References Cited

U.S. PATENT DOCUMENTS

2018/0072339 A1* 3/2018 Bodtker ................ B62D 5/001

* cited by examiner

*Primary Examiner* — Xiao En Mo
(74) *Attorney, Agent, or Firm* — Ingrassia Fisher & Lorenz, LLP | IF&L

(57) ABSTRACT

A steer by wire includes a steering wheel holding system. An emulator controller receives vehicle data from vehicle systems and determines whether a vehicle is in one of a driving mode and a non-driving mode. When the vehicle is in the driving mode, the emulator controller transmits a command to an emulator switching system to electrically couple the phases of an emulator motor to a power source to enable the emulator motor to implement steer by wire operations placing the steering wheel in an un-hold mode. When the vehicle is in the non-driving mode, the emulator controller transmits a command to the emulator switching system to electrically couple the phases of the emulator motor to ground to short the phases of the emulator motor to ground to generate a resistive torque to resist rotational movement of a steering wheel of the vehicle placing the steering wheel in a hold mode.

20 Claims, 6 Drawing Sheets

SYSTEMS AND METHODS FOR HOLDING A STEERING WHEEL IN A STEER BY WIRE SYSTEM

INTRODUCTION

The technical field generally relates to vehicles, and more particularly relates to systems and methods for holding a steering wheel in a steer by wire system.

A steer by wire system eliminates an intermediate shaft between a steering wheel and a steering rack of a vehicle. When the vehicle is stationary and powered off, the steering wheel can be freely rotated without causing any corresponding movement on the steering rack. In many instances, a driver may use the steering wheel for support during entry into and exit from the vehicle, inadvertently rotating the steering wheel. This may cause the steering wheel to be out of sync with the steering rack. It may not be possible to effectively implement synchronization between the steering wheel and steering rack before a driver starts driving the vehicle. In addition, moving the steering rack automatically during a synchronization process without input from the driver may cause a disturbance to the driver.

Accordingly, it is desirable to provide systems and methods for holding a steering wheel in a steer by wire system when a vehicle is stationary and powered off. Other desirable features and characteristics will become apparent from the subsequent detailed description and the appended claims, taken in conjunction with the accompanying drawings and the foregoing technical field and background.

SUMMARY

A steer by wire system including a steering wheel holding system includes a steering wheel, an emulator motor, an emulator switching system, and an emulator controller. The emulator motor is electrically coupled to the steering wheel and includes a plurality of phases. The emulator switching system is configured to electrically couple each of the plurality of phases of the emulator motor to one of a power source and ground. The emulator controller is electrically coupled to the emulator motor and the emulator switching system. The emulator controller is configured to: receive vehicle data from at least one vehicle system of a vehicle; determine whether the vehicle is in one of a driving mode and a non-driving mode based on the vehicle data; upon a determination that the vehicle is in the driving mode, transmit a first command to the emulator switching system to electrically couple each of the plurality of phases of the emulator motor to the power source to place the steering wheel in an un-hold mode to enable the emulator motor to implement steer by wire operations; and upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

In at least one embodiment, the vehicle data includes an ignition status from an ignition system of the vehicle, the ignition status being one of an ignition on status and an ignition off status; vehicle movement data from a vehicle dynamics sensor system; and a vehicle transmission mode of a transmission system of the vehicle.

In at least one embodiment, the emulator controller is further configured to determine the vehicle to be in the non-driving mode responsive receipt of the ignition off status from the ignition system, receipt of vehicle movement data associated with a stationary vehicle, and receipt of the vehicle transmission mode being a park transmission mode from the transmission system.

In at least one embodiment, the emulator controller is configured to receive a third command from a body control module of the vehicle to enter a sleep mode when the vehicle is in the non-driving mode.

In at least one embodiment, the system includes a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to: transition from the sleep mode to a wake-up mode responsive to the trigger signal; responsive to receipt of an ignition off status from an ignition system of the vehicle indicating that the vehicle is in the non-driving mode, transmit the second command to the emulator switching system to maintain electrically coupling of each of the plurality of phases of the emulator motor to ground; and responsive to receipt of an ignition on status from the ignition system of the vehicle indicating that the vehicle has transitioned to the driving mode, transmit the first command to the emulator switching system to electrically couple each of the plurality of phases of the emulator motor to the power source.

In at least one embodiment, the system includes a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to: transition from the sleep mode to a wake-up mode responsive to the trigger signal; receive steering wheel position data from a steering wheel sensor; identify a rotational angle change of the steering wheel based on the steering wheel position data; and transmit the rotational angle change of the steering wheel to a steering rack controller of a steering rack of the vehicle when the vehicle transitions from the non-driving mode to the driving mode.

In at least one embodiment, the emulator switching system includes a plurality of single pole, double throw (SPDT) relays, each of the plurality of SPDT relays being configured to electrically couple an associated one of the plurality of phases of the emulator motor to one of the power source and ground.

In at least one embodiment, the emulator switching system includes a plurality of metal-oxide-semiconductor field-effect transistors (MOSFETs) each of the plurality of MOSFET being configured to electrically couple an associated one of the plurality of phases of the emulator motor to one of the power source and ground.

In at least one embodiment, a gear ratio between the emulator motor and the steering wheel is eleven to one.

A vehicle including a steer by wire system including a steering wheel holding system includes a steering wheel, an emulator motor, an emulator switching system, and an emulator controller. The emulator motor is electrically coupled to the steering wheel and includes a plurality of phases. The emulator switching system is configured to electrically couple each of the plurality of phases of the emulator motor to one of a power source and ground. The emulator controller is electrically coupled to the emulator motor and the emulator switching system. The emulator controller is configured to: receive vehicle data from at least one vehicle system of a vehicle; determine whether the vehicle is in one of a driving mode and a non-driving mode based on the vehicle data; upon a determination that the vehicle is in the driving mode, transmit a first command to the emulator switching system to electrically couple each of the plurality of phases of the emulator motor to the power source to place the steering wheel in an un-hold mode to enable the emulator motor to implement steer by wire operations; and upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

In at least one embodiment, the vehicle data includes: an ignition status from an ignition system of the vehicle, the ignition status being one of an ignition on status and an ignition off status; vehicle movement data from a vehicle dynamics sensor system; and a vehicle transmission mode of a transmission system of the vehicle.

In at least one embodiment, the emulator controller is further configured to determine the vehicle to be in the non-driving mode responsive receipt of the ignition off status from the ignition system, receipt of vehicle movement data associated with a stationary vehicle, and receipt of the vehicle transmission mode being a park transmission mode from the transmission system.

In at least one embodiment, the emulator controller is configured to receive a third command from a body control module of the vehicle to enter a sleep mode when the vehicle is in the non-driving mode.

In at least one embodiment, the vehicle includes a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to: transition from the sleep mode to a wake-up mode responsive to the trigger signal; responsive to receipt of an ignition off status from an ignition system of the vehicle indicating that the vehicle is in the non-driving mode, transmit the second command to the emulator switching system to maintain electrically coupling of each of the plurality of phases of the emulator motor to ground; and responsive to receipt of an ignition on status from the ignition system of the vehicle indicating that the vehicle has transitioned to the driving mode, transmit the first command to the emulator switching system to electrically couple each of the plurality of phases of the emulator motor to the power source.

In at least one embodiment, the vehicle includes a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to: transition from the sleep mode to a wake-up mode responsive to the trigger signal; receive steering wheel position data from a steering wheel sensor; identify a rotational angle change of the steering wheel based on the steering wheel position data; and transmit the rotational angle change of the steering wheel to a steering rack controller of a steering rack of the vehicle when the vehicle transitions from the non-driving mode to the driving mode.

In at least one embodiment, the emulator switching system includes a plurality of single pole, double throw (SPDT) relays, each of the plurality of SPDT relays being configured to electrically couple an associated one of the plurality of phases of the emulator motor to one of the power source and ground.

In at least one embodiment, the emulator switching system includes a plurality of metal-oxide-semiconductor field-effect transistors (MOSFETs) each of the plurality of MOSFET being configured to electrically couple an associated one of the plurality of phases of the emulator motor to one of the power source and ground.

In at least one embodiment, a gear ratio between the emulator motor and the steering wheel is eleven to one.

A method for holding a steering wheel in a steer by wire system includes: receiving vehicle data from at least one vehicle system of a vehicle; determining whether the vehicle is in one of a driving mode and a non-driving mode based on the vehicle data; upon a determination that the vehicle is in the driving mode, transmit a first command to an emulator switching system to electrically couple each of the plurality of phases of the emulator motor to a power source to place a steering wheel in an un-hold mode to enable the emulator motor to implement steer by wire operations; and upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

In at least one embodiment, the method further includes determining the vehicle to be in the non-driving mode responsive receipt of an ignition off status from an ignition system of the vehicle, receipt of vehicle movement data associated with a stationary vehicle from a vehicle dynamics sensor, and receipt of a vehicle transmission mode being a park transmission mode from a transmission system of the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
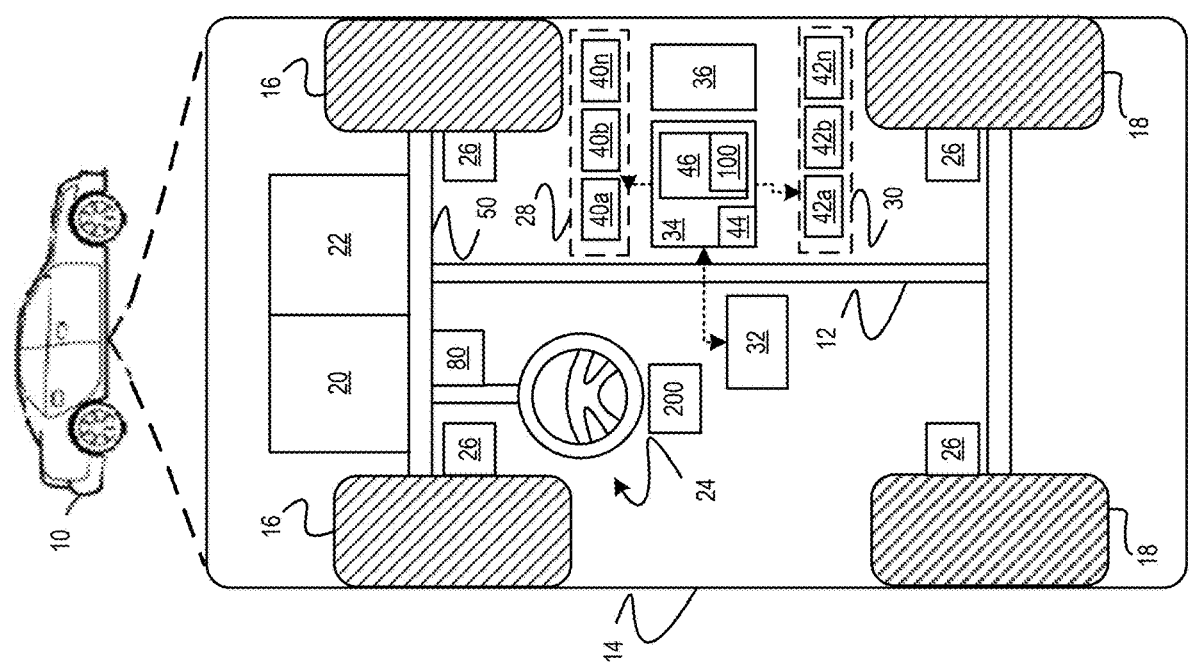
FIG. 1 is a functional block diagram of a vehicle including a steer by wire system including a steering wheel holding system in accordance with at least one embodiment.

Referring to FIG. 1, a functional block diagram of a vehicle including a steer by wire system 24 including a steering wheel holding system 200 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16. The steer by wire system 24 includes a steering wheel holding system 200 in accordance with at least one embodiment.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42a-42n that control one or more vehicle features such as, but not limited to, one or more vehicle wheels 16-18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
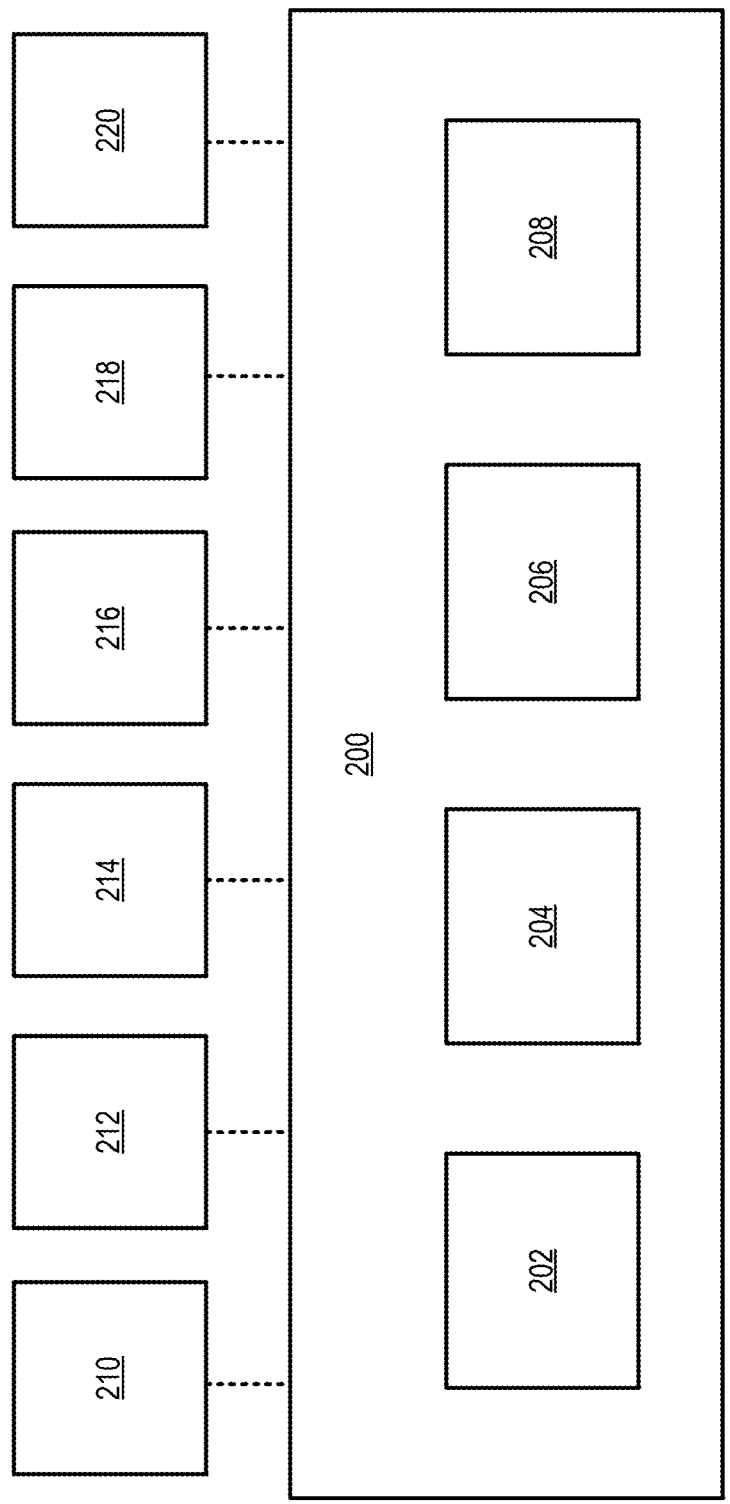
FIG. 2 is a functional block diagram of a steering wheel holding system in accordance with at least one embodiment.

Referring to FIG. 2, a functional block diagram of a steering wheel holding system 200 in accordance with at least one embodiment is shown. A steer by wire system 24 includes that steering wheel holding system 200. The steering wheel holding system 200 includes an emulator controller 202, an emulator switching system 204, a current detection system 206, and an emulator motor 208. The steering wheel holding system 200 includes one or more components of the steer by wire system 24. The steering wheel holding system 200 is configured to place a steering wheel 216 of the vehicle 10 in an un-hold mode when the vehicle 10 in in a driving mode and in a hold mode when the vehicle 10 is in a non-driving mode.

The emulator controller 202 is similar to the controller 34 described with reference to FIG. 1. The emulator controller 202 includes at least one processor and at least one memory. The at least one processor is a programable device that includes one or more instructions stored in or associated with the at least one memory. The at least one memory includes instructions that the at least one processor is configured to execute to implement operations associated with the steering wheel holding system 200.

The emulator switching system 204 includes a plurality of switches. In at least one embodiment, the plurality of switches are single pole, double throw (SPDT) relays. In at least one embodiment, the plurality of switches are metal-oxide-semiconductor field-effect transistors (MOSFETs). The current detection system 206 includes a plurality of current detectors. The emulator motor 208 is a multi-phase motor that includes a plurality of phases. In at least one embodiment, the emulator motor 208 is a three-phase motor. In at least one embodiment, the emulator motor 208 is a multiple stacked motor.

A vehicle 10 includes the steer by wire system 24 including the steering wheel holding system 200. The steering wheel holding system 200 is configured to be communicatively coupled to a plurality of vehicle systems 210, 212, 214, 216, 218, 220. In various embodiments, the vehicle systems include an ignition system 210, a vehicle dynamics sensor system 212, a transmission system 214, a steering wheel 216, a steering wheel sensor 218, and a steering rack controller 220. The steering wheel holding system 200 is configured to receive vehicle data from the ignition system 210, the vehicle dynamics sensor system 212, and the transmission system 214. Examples of vehicle data include, but are not limited to, an ignition status, vehicle movement data, and a vehicle transmission mode.

The steering wheel holding system 200 is configured to receive the ignition status of the ignition system 210. The ignition status of the ignition is one of an ignition on status and ignition off status. In at least one embodiment, the steering wheel holding system 200 is configured to receive the ignition status directly from the ignition system 210. In at least one embodiment, a controller 34 in vehicle 10 may track the status of the ignition system and the steering wheel holding system 200 is configured to receive the ignition status from the controller 34.

The steering wheel holding system 200 is configured to receive the vehicle movement data from the vehicle dynamics sensor system 212. The vehicle movement data indicates whether the vehicle 10 is in motion or is stationary. In at least one embodiment, the steering wheel holding system 200 is configured to receive vehicle movement data directly from the vehicle dynamics sensor system 212. In at least one embodiment, a controller 34 in vehicle 10 collects vehicle movement data from the vehicle dynamics sensor system 212 and the steering wheel holding system 200 is configured to receive the vehicle movement data from the controller 34.

The steering wheel holding system 200 is configured to receive the vehicle transmission mode from a transmission system 214 of the vehicle. The transmission system 214 is similar to the transmission system 22 described with reference to FIG. 1. In at least one embodiment, the vehicle transmission modes include, but are not limited to, a drive transmission mode, a neutral transmission mode, a park transmission mode, and a reverse transmission mode. In at least one embodiment, the steering wheel holding system 200 is configured to receive the vehicle transmission mode directly from the transmission system 214. In at least one embodiment, a controller 34 in vehicle 10 receives the vehicle transmission mode from the transmission system 214 and the steering wheel holding system 200 is configured to receive the vehicle transmission mode from the controller 34.

The steering wheel holding system 200 is mechanically coupled to the steering wheel 216 of the vehicle 10. The vehicle 10 operates in one of the driving mode and the non-driving mode. The emulator controller 202 determines whether the vehicle 10 is in the driving mode or the non-driving mode based on the vehicle data. The emulator motor 208 is mechanically coupled to the steering wheel 216. The emulator switching system 204 is configured to electrically couple the phases of the emulator motor 208 to a power source when the vehicle 10 is in driving mode and the steering wheel 216 is in an un-hold mode. The emulator motor 208 is configured to mechanically implement steer by wire operations when the phases of the emulator motor 208 are electrically coupled to the power source.

The emulator switching system 204 is configured to electrically couple the phases of the emulator motor 208 to ground to short the phases of the emulator motor 208 to ground when the vehicle 10 is in non-driving mode. The emulator motor 208 is configured to mechanically implement steering wheel holding operations when the phases of the emulator motor 208 are electrically coupled shorted to ground. When the phases of the emulator motor 208 are simultaneously disconnected from the power source and are shorted to ground, the emulator motor 208 operates as a generator and generates resistive torque to the steering wheel 216 to resist rotational movement of the steering wheel 216 and places the steering wheel 216 in a hold mode The steering wheel holding system 200 is configured to receive steering wheel position data from the steering wheel sensor 218. The emulator controller 202 is configured to track the position of the steering wheel based on the steering wheel position data. When the vehicle 10 is in the driving mode, the emulator controller 202 is configured to transmit the position of the steering wheel to the steering rack controller 220 to implement steer by wire operations. The emulator controller 202 is configured to receive steering rack data from the steering rack controller 220 and issue commands to the emulator motor 208 to adjust the position of the steering wheel in accordance with steering rack data to implement steer by wire operations. When the vehicle10 in in a non-driving mode, the emulator controller 202 is configured to implement steering wheel holding operations. The steering wheel holding operations will be described in greater detail below.

Figure 3:
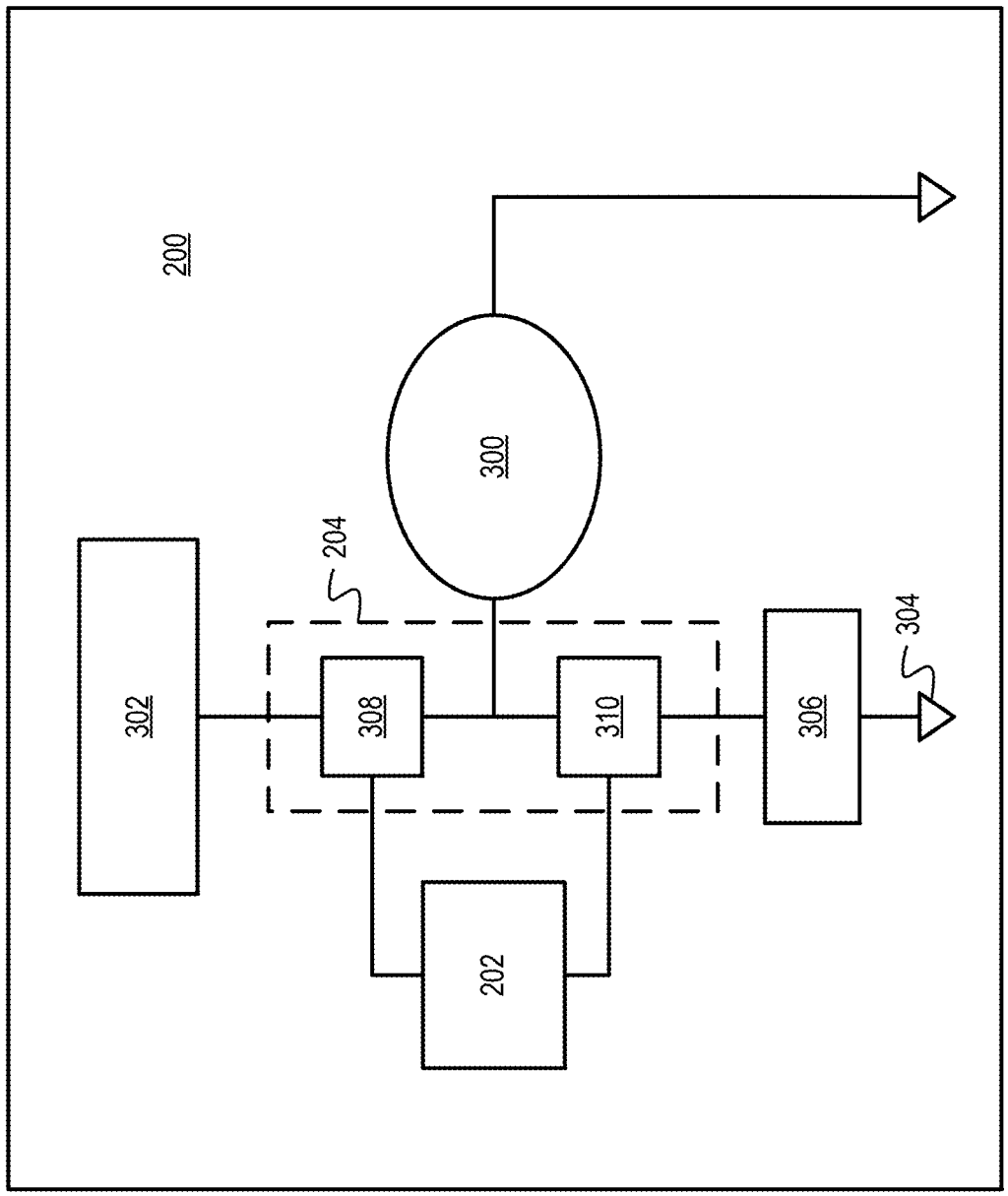
FIG. 3 is a functional block diagram of a portion of a steering wheel holding system including an emulator motor phase of an emulator motor in accordance with at least one embodiment.

Referring to FIG. 3, a functional block diagram of a portion of a steering wheel holding system 200 including an emulator motor phase 300 of an emulator motor 208 in accordance with at least one embodiment is shown.

The emulator motor 208 includes a plurality of emulator motor phases 300. The emulator switching system 204 includes a plurality of switch pairs 308, 310. The current detection system 206 includes a plurality of current detectors 306.

The emulator controller 202 manages the opening and closing of individual switches in the switch pair 308, 310. When the emulator controller 202 determines that the vehicle 10 is in driving mode based on vehicle data receive from vehicle systems 210, 212, 214 of the vehicle 10, the emulator controller 202 issues a command to close the switch 308 thereby electrically coupling the emulator motor phase 300 to the power source 302 and to open the switch 310 thereby disconnecting an electrical coupling between the emulator motor phase 300 and ground 304. Electrically coupling each of the emulator motor phases 300 to the power source 302 while disconnecting electrical coupling between each of the emulator motor phases 300 and ground 304 places the steering wheel 216 in an un-hold mode. Placing the steering wheel 216 in the un-hold mode enables the implementation of steer by wire operations by the steer by wire system 24 of the vehicle 10. The switches 308, 310 are exclusively opened. Only one of the switches 308, 310 can be opened at one time. Both switches 308, 310 cannot be open at the same time. When the switch 308 is opened, the switch 310 is closed and when the switch 310 is opened, the switch 308 is closed.

When the emulator controller 202 determines that the vehicle 10 is in non-driving mode based on vehicle data receive from vehicle systems 210, 212, 214 of the vehicle 10, the emulator controller 202 issues a command to simultaneously open the switch 308 thereby disconnecting electrically coupling between emulator motor phase 300 and the power source 302 and to close the switch 310 thereby electrical coupling the emulator motor phase 300 to ground 304. Electrically coupling the emulator motor phase 300 to ground 304 shorts the emulator motor phase 300 to ground. Shorting the emulator motor phases 300 of the emulator motor 208 to ground causes the emulator motor 208 to operate as a generator. The emulator motor 208 generates a resistive torque for application to the steering wheel 216 thereby placing the steering wheel 216 in hold mode. When the steering wheel 216 is in hold mode, the steer wheel resists rotational movement. The emulator controller 202 enters into a sleep mode following the issuance of commands to the emulator switching system 204 to place the steering wheel 216 in the hold mode.

When the steering wheel 216 is in the hold mode, the steering wheel 216 resists rotational movement. However, when the rotational force is applied to the steering wheel exceeds a rotational force threshold, that rotational force overcomes the resistive torque applied to the steering while 216 by the emulator motor 208 causing an angular rotation of the steering wheel 216. When the switch 310 is closed, the current detector 306 is electrically coupled to the emulator motor phase 300 and ground 304. When the rotational force exceeds the rotational force threshold and the rotational force causes an angular rotation of the steering wheel 216, a there is a flow of current from the emulator motor phase 300 to ground 304. The flow of current is detected by the current detector 306. Upon the detection of the flow of current, the current detector 306 generates a trigger signal for transmission to the emulator controller 202. The emulator controller 202 transitions from the sleep mode to a wake-up mode in response to the trigger signal.

The emulator controller 202 stores a position of the steering wheel 216 at the time that the emulator controller 202 entered the sleep mode. In wake-up mode, the emulator controller 202 receives steering wheel position data from a steering wheel sensor 218. The emulator controller 202 identifies a rotational angle change of the steering wheel resulting from the application of the rotational force that exceeded the rotational force threshold based on the steering wheel data. The emulator controller 202 stores the rotational angle change. In at least one embodiment, the emulator controller 202 returns to sleep mode following the storing of the rotational angle change.

When the vehicle 10 transitions from non-driving mode to driving mode, the emulator controller 202 enters the wake-up mode and transmits the rotational angle change to the steering rack controller 220 to enable synchronization of the position of the steering wheel between the emulator controller 202 and the steering rack controller 220 in order to effectively implement steer by wire operations.

Figure 4:
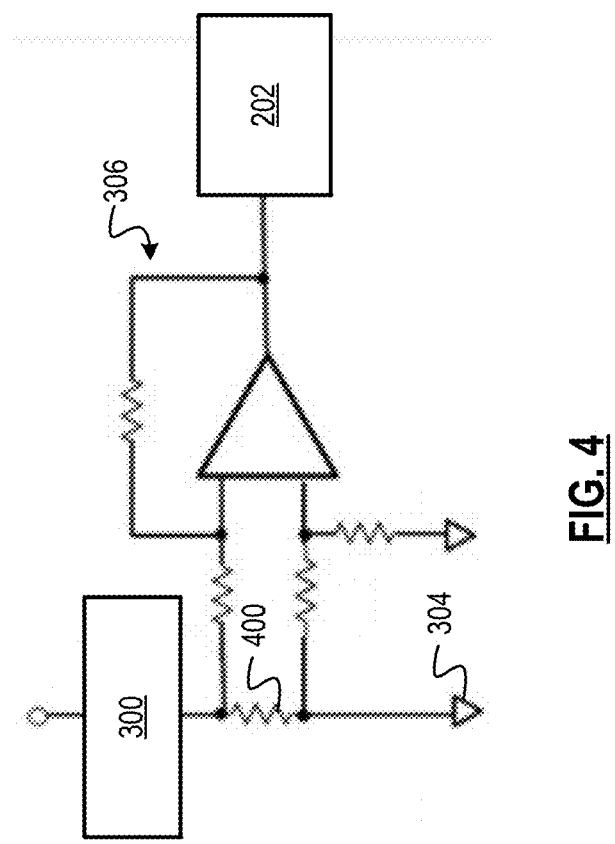
FIG. 4 is a circuit diagram of an exemplary current detector in accordance with at least one embodiment.

Referring to FIG. 4, a circuit diagram of an exemplary current detector 306 in accordance with at least one embodiment is shown. In at least one embodiment, the current detector 306 is an operational amplifier (op amp) circuit. The op amp circuit includes a current sensing resistor 400. A current sensing voltage is generated across the current sensing resistor 400 when there is a flow of current from an emulator motor phase 300 to ground 304. The current sensing voltage is amplified by the op amp circuit and generated at the output of the op amp circuit as a trigger signal. The output of the op amp circuit is electrically coupled to the emulator controller 202. The trigger signal generated by the op amp in response to a flow of current from the emulator motor phase 300 to ground 304 is transmitted to the emulator controller 202. Responsive to receipt of the trigger signal, the emulator controller 202 transitions from a sleep mode to a wake-up mode. While one example of a current detector 306 has been described, in alternative embodiments other types of current detectors 306 may be used.

Figure 5:
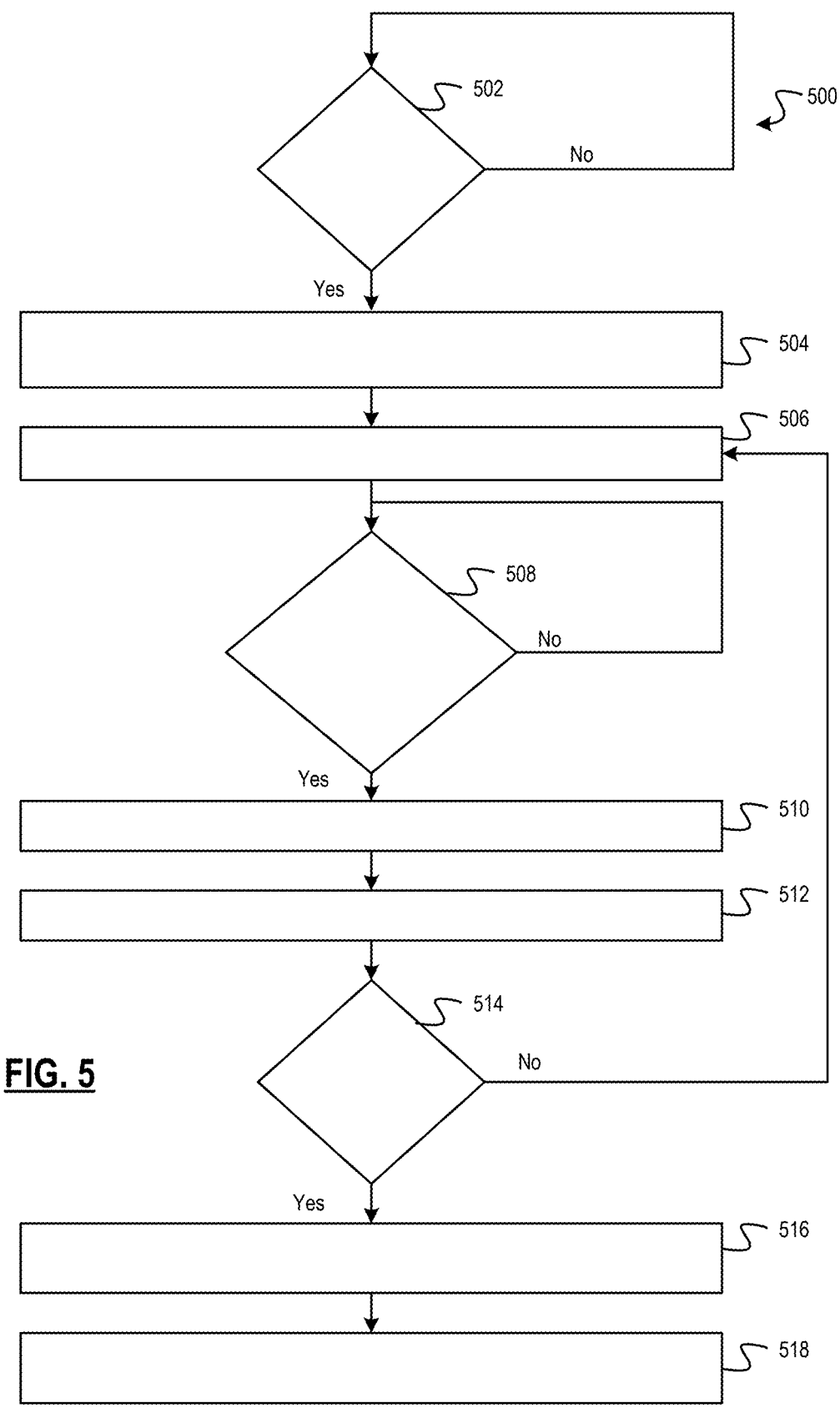
FIG. 5 is a flowchart representation of an exemplary method for holding a steering wheel in a steer by wire system in accordance with at least one embodiment.

Referring to FIG. 5, a flowchart representation of an exemplary method 500 for holding a steering wheel in a steer by wire system in accordance with at least one embodiment is shown. The method 500 will be described with reference to an exemplary implementation of an embodiment of a steer by wire system 24 including a steering wheel holding system 200. As can be appreciated in light of the disclosure, the order of operation within the method 500 is not limited to the sequential execution as illustrated in FIG. 5 but may be performed in one or more varying orders as applicable and in accordance with the present disclosure.

At 502, an emulator controller 202 determines whether the vehicle 10 is in a non-driving mode. In at least one embodiment, the emulator controller 202 receives vehicle data generated by several vehicle systems 210, 212, 214 of the vehicle. The vehicle systems include, but are not limited to, an ignition system 210, a vehicle dynamics sensor system 212, and a transmission system 214. The vehicle data includes, but are not limited to, an ignition status of the ignition system 210, vehicle movement data generated by the vehicle dynamics sensor system 212, and a vehicle transmission mode of the transmission system 214. The ignition status of the ignition system 210 can be one of an ignition on status and an ignition off status. The vehicle movement data indicates whether the vehicle 10 is in motion or is stationary. The vehicle transmission mode can be one of a drive transmission mode, a neutral transmission mode, a park transmission mode, and a reverse transmission mode.

The emulator controller 202 determines that the vehicle 10 is in a non-driving mode, if the ignition status of the ignition system 210 is an ignition off status, vehicle movement data indicates that the vehicle 10 is a stationary vehicle, and the transmission mode is a park transmission mode. Under all other combinations of conditions associated with the ignition system 210, the vehicle movement data, and the transmission system 214, the emulator controller 202 determines that the vehicle 10 is in a driving mode.

If the emulator controller determines that the vehicle 10 is in the driving mode, the emulator switching system 204 maintains electrical coupling of each of the emulator motor phases 300 of the emulator motor 208 to the power source 302. Maintaining electrical coupling of each of the emulator motor phases 300 of the emulator motor 208 to the power source 302 maintains the steering wheel 216 in an un-hold mode to enable the emulator motor 208 to implement steer by wire operations. The method 500 repeats 502.

If the emulator controller 202 determines that the vehicle 10 is in the non-driving mode, the emulator motor phases 300 of the emulator motor 208 are shorted to ground placing the steering wheel 216 in hold mode. The emulator controller 202 issues a command to the emulator switching system 204 to simultaneously disconnect the power source 302 from the emulator motor phases 300 of the emulator motor 208 while electrically coupling the emulator motor phases 300 of the emulator motor 208 to ground to place the steering wheel 216 in the hold mode. This causes the emulator motor 208 to operate as a generator and generate a resistive torque for application to the steering wheel 216 to resist rotational movement.

At 506, the emulator controller 202 goes from a wake-up mode into a sleep mode. In at least one embodiment, a body control module of the vehicle 10 transmits a sleep mode command to the emulator controller 202 when the vehicle 10 enters into non-driving mode. The emulator controller 202 enters into the sleep mode responsive to sleep command.

At 508, the current detection system 206 determines whether there is current flow from the emulator motor phases 300 of the emulator motor 208 to ground 304. The current detection system 206 includes a plurality of current detectors 306. Each of the current detectors 306 is configured to detect current flow from an associated emulator motor phase 300 to ground when the vehicle 10 is in the non-driving mode and the emulator motor 208 is shorted to ground 304.

When the steering wheel 216 is in the hold mode, the steering wheel 216 resists rotational movement. However, when the rotational force is applied to the steering wheel 216 exceeds a rotational force threshold, that rotational force overcomes the resistive torque applied to the steering while 216 by the emulator motor 208 causing an angular rotation of the steering wheel 216. Angular rotation of the steering wheel 216 causes current to flow from the emulator motor phases 300 to ground 304. The rotational force may be applied to the steering wheel 216, for example, when a driver that grabs the steering wheel 216 for support while exiting or entering the vehicle 10.

If the current detection system 206 does not detect current flow from the emulator motor phases 300 of the emulator motor 208 to ground 304, there has been no angular rotation of the steering wheel, and the method repeats 508.

If the current detection system 206 does detect current flow from the emulator motor phases 300 of the emulator motor 208 to ground 304, there has been an angular rotation of the steering wheel 216. Upon the detection of the current flow from the emulator motor phases 300 of the emulator motor 208 to ground 304, the current detector 306 generates a trigger signal for transmission to the emulator controller 202. At 510, the emulator controller 202 transitions from the sleep mode to a wake-up mode in response to the trigger signal.

At 512, the emulator controller 202 identifies a rotational angle change in the position of the steering wheel 216 resulting from the application of the rotational force that overcame the resistive torque applied to the steering wheel 216 by the emulator motor 208. The emulator controller 202 stores a position of the steering wheel 216 at the time that the emulator controller 202 entered the sleep mode. In wake-up mode, the emulator controller 202 receives steering wheel position data from a steering wheel sensor 218. The emulator controller 202 identifies the rotational angle change of the steering wheel 216. The emulator controller 202 stores the rotational angle change at the emulator controller 202.

At 514, the emulator controller 202 determines whether the vehicle 10 is in the driving mode. If the emulator controller 202 determines that the vehicle 10 has not transitioned from the non-driving mode to the driving mode, the method returns to 506 and the emulator controller 202 transitions from wake-up mode to sleep mode. If the emulator controller 202 determines that the vehicle 10 has transitioned from the non-driving mode to the driving mode, the emulator controller 202 issues a command to the emulator switching system 204 to electrically uncouple the emulator motor phases 300 of the emulator motor 208 from ground 304 and electrically couple the emulator motor phases 300 of the emulator motor 208 to the power source 302 placing the steering wheel in the un-hold mode and enabling the emulator motor 208 to implement steer by wire operations at 516. At 518, the emulator controller 202 transmits the rotational angle change to the steering rack controller 220 to enable synchronization of the position of the steering wheel between the emulator controller 202 and the steering rack controller 220 in order to effectively implement steer by wire operations.

Figure 6:
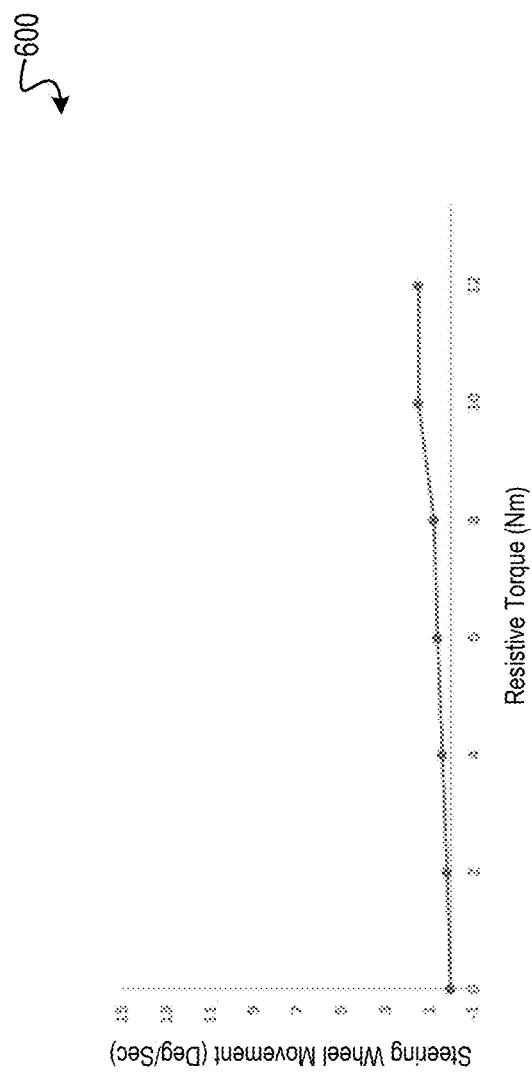
FIG. 6 is an exemplary graphical representation of steering wheel rotational velocity as a function of resistive torque applied by an emulator motor in accordance with at least one embodiment.

Referring to FIG. 6, an exemplary graphical representation 600 of steering wheel rotational velocity as a function of resistive torque applied by an emulator motor 208 in accordance with at least one embodiment. When the vehicle 10 is in the non-driving mode and the steering wheel 216 is in the hold-mode, the emulator motor 208 applies a resistive torque to the steering wheel 216 so that the steering wheel 216 resists rotational movement. In at least one embodiment, as the rotational velocity of the rotational force applied to the steering wheel 216 increases, the emulator motor 208 increases the amount of resistive torque applied to the steering wheel 216. The graph 600 represents an example of a relationship between the rotational velocity of the rotational force applied to the steering wheel 216 and the resistive torque applied by the emulator motor 208 to the steering wheel 216.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A steer by wire system including a steering wheel holding system comprising:
    a steering wheel;
    a emulator motor electrically coupled to the steering wheel, the emulator motor comprising a plurality of phases;
    an emulator switching system configured to electrically couple each of the plurality of phases of the emulator motor to one of a power source and ground; and
    an emulator controller electrically coupled to the emulator motor and the emulator switching system, the emulator controller being configured to:
        receive vehicle data from at least one vehicle system of a vehicle;
        determine whether the vehicle is in one of a driving mode and a non-driving mode based on the vehicle data;
        upon a determination that the vehicle is in the driving mode, transmit a first command to the emulator switching system to electrically couple each of the plurality of phases of the emulator motor to the power source to place the steering wheel in an un-hold mode to enable the emulator motor to implement steer by wire operations; and
        upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

2. The system of claim 1, wherein the vehicle data comprises:
an ignition status from an ignition system of the vehicle, the ignition status being one of an ignition on status and an ignition off status;
vehicle movement data from a vehicle dynamics sensor system; and
a vehicle transmission mode of a transmission system of the vehicle.

3. The system of claim 2, wherein the emulator controller is further configured to determine the vehicle to be in the non-driving mode responsive receipt of the ignition off status from the ignition system, receipt of vehicle movement data associated with a stationary vehicle, and receipt of the vehicle transmission mode comprising a park transmission mode from the transmission system.

4. The system of claim 1, wherein the emulator controller is configured to receive a third command from a body control module of the vehicle to enter a sleep mode when the vehicle is in the non-driving mode.

5. The system of claim 4, further comprising a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and
the emulator controller is further configured to:
transition from the sleep mode to a wake-up mode responsive to the trigger signal;
responsive to receipt of an ignition off status from an ignition system of the vehicle indicating that the vehicle is in the non-driving mode, transmit the second command to the emulator switching system to maintain electrically coupling of each of the plurality of phases of the emulator motor to ground; and
responsive to receipt of an ignition on status from the ignition system of the vehicle indicating that the vehicle has transitioned to the driving mode, transmit the first command to the emulator switching system to electrically couple each of the plurality of phases of the emulator motor to the power source.

6. The system of claim 4, further comprising a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and
the emulator controller is further configured to:
transition from the sleep mode to a wake-up mode responsive to the trigger signal;
receive steering wheel position data from a steering wheel sensor;
identify a rotational angle change of the steering wheel based on the steering wheel position data; and
transmit the rotational angle change of the steering wheel to a steering rack controller of a steering rack of the vehicle when the vehicle transitions from the non-driving mode to the driving mode.

7. The system of claim 1, wherein the emulator switching system comprises a plurality of single pole, double throw (SPDT) relays, each of the plurality of SPDT relays being configured to electrically couple an associated one of the plurality of phases of the emulator motor to one of the power source and ground.

8. The system of claim 1, wherein the emulator switching system comprises a plurality of metal-oxide-semiconductor field-effect transistors (MOSFETs) each of the plurality of MOSFET being configured to electrically couple an associated one of the plurality of phases of the emulator motor to one of the power source and ground.

9. The system of claim 1, wherein a gear ratio between the emulator motor and the steering wheel is eleven to one.

10. A vehicle including a steer by wire system including a steering wheel holding system comprising:
a steering wheel;
an emulator motor electrically coupled to the steering wheel, the emulator motor comprising a plurality of phases;
an emulator switching system configured to electrically couple each of the plurality of phases of the emulator motor to one of a power source and ground; and
an emulator controller electrically coupled to the emulator motor and the emulator switching system, the emulator controller being configured to:
receive vehicle data from at least one vehicle system of the vehicle;
determine whether the vehicle is in one of a driving mode and a non-driving mode based on the vehicle data;
upon a determination that the vehicle is in the driving mode, transmit a first command to the emulator switching system to electrically couple each of the plurality of phases of the emulator motor to the power source to place the steering wheel in an un-hold mode to enable the emulator motor to implement steer by wire operations; and
upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

11. The vehicle of claim 10, wherein the vehicle data comprises:
an ignition status from an ignition system of the vehicle, the ignition status being one of an ignition on status and an ignition off status;
vehicle movement data from a vehicle dynamics sensor system; and
a vehicle transmission mode of a transmission system of the vehicle.

12. The vehicle of claim 11, wherein the emulator controller is further configured to determine the vehicle to be in the non-driving mode responsive receipt of the ignition off status from the ignition system, receipt of vehicle movement data associated with a stationary vehicle, and receipt of the vehicle transmission mode comprising a park transmission mode from the transmission system.

13. The vehicle of claim 10, wherein the emulator controller is configured to receive a third command from a body control module of the vehicle to enter a sleep mode when the vehicle is in the non-driving mode.

14. The vehicle of claim 13, further comprising a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to:
transition from the sleep mode to a wake-up mode responsive to the trigger signal;
responsive to receipt of an ignition off status from an ignition system of the vehicle indicating that the vehicle is in the non-driving mode, transmit the second command to the emulator switching system to maintain electrically coupling of each of the plurality of phases of the emulator motor to ground; and
responsive to receipt of an ignition on status from the ignition system of the vehicle indicating that the vehicle has transitioned to the driving mode, transmit the first command to the emulator switching system to electrically couple each of the plurality of phases of the emulator motor to the power source.

15. The vehicle of claim 13, further comprising a current detection system including a plurality of current detectors, wherein each of the plurality of current detectors is electrically coupled to one of the plurality of phases of the emulator motor and ground when the vehicle is in non-driving mode to detect a flow of current from each the of the plurality of phases of the emulator motor to ground and configured to generate a trigger signal for transmission to the emulator controller responsive to detection of the flow of current from each the of the plurality of phases of the emulator motor to ground; and the emulator controller is further configured to:
transition from the sleep mode to a wake-up mode responsive to the trigger signal;
receive steering wheel position data from a steering wheel sensor;
identify a rotational angle change of the steering wheel based on the steering wheel position data; and
transmit the rotational angle change of the steering wheel to a steering rack controller of a steering rack of the vehicle when the vehicle transitions from the non-driving mode to the driving mode.

16. The vehicle of claim 10, wherein the emulator switching system comprises a plurality of single pole, double throw (SPDT) relays, each of the plurality of SPDT relays being configured to electrically couple an associated one of the plurality of phases of the emulator motor to one of the power source and ground.

17. The vehicle of claim 10, wherein the emulator switching system comprises a plurality of metal-oxide-semiconductor field-effect transistors (MOSFETs) each of the plurality of MOSFET being configured to electrically couple an associated one of the plurality of phases of the emulator motor to one of the power source and ground.

18. The vehicle of claim 10, wherein a gear ratio between the emulator motor and the steering wheel is eleven to one.

19. A method for holding a steering wheel in a steer by wire system comprising:
receiving vehicle data from at least one vehicle system of a vehicle;
determining whether the vehicle is in one of a driving mode and a non-driving mode based on the vehicle data;
upon a determination that the vehicle is in the driving mode, transmit a first command to an emulator switching system to electrically couple each of a plurality of phases of an emulator motor to a power source to place the steering wheel in an un-hold mode to enable the emulator motor to implement steer by wire operations; and
upon a determination that the vehicle is in the non-driving mode, transmit a second command to the emulator switching system to electrically couple each of the plurality of phases of the emulator motor to ground to short the plurality of phases of the emulator motor to ground resulting in the emulator motor generating a resistive torque to resist rotational movement of the steering wheel placing the steering wheel in a hold mode.

20. The method of claim 19, further comprising determining the vehicle to be in the non-driving mode responsive receipt of an ignition off status from an ignition system of the vehicle, receipt of vehicle movement data associated with a stationary vehicle from a vehicle dynamics sensor, and receipt of a vehicle transmission mode comprising a park transmission mode from a transmission system of the vehicle.

\* \* \* \* \*